United States Patent [19]
van Erp et al.

[11] 3,992,257
[45] Nov. 16, 1976

[54] NEUTRON-ABSORBER RELEASE DEVICE

[75] Inventors: Jan B. van Erp, Hinsdale; Edward L. Kimont, Evergreen Park, Ill.

[73] Assignee: The United States of America as represented by the United States Energy Research and Development Administration, Washington, D.C.

[22] Filed: Aug. 13, 1975

[21] Appl. No.: 604,385

[52] U.S. Cl. .................................. 176/36 C; 74/2
[51] Int. Cl.² ............................................ G21C 7/08
[58] Field of Search ................... 49/7, 8; 73/358; 169/42; 116/114.5; 74/2; 137/75, 74, 72, 73; 222/54; 176/22, 36 R, DIG. 5, 36 C

[56] References Cited
UNITED STATES PATENTS
3,236,739  2/1966  Lange et al. ........................ 176/22
FOREIGN PATENTS OR APPLICATIONS
34,215  2/1922  Norway ................................. 137/75

*Primary Examiner*—Samuel Feinberg
*Attorney, Agent, or Firm*—Dean E. Carlson; Arthur A. Churm; Paul A. Gottlieb

[57] ABSTRACT

A resettable device is provided for supporting an object, sensing when an environment reaches a critical temperature and releasing the object when the critical temperature is reached. It includes a flexible container having a material inside with a melting point at the critical temperature. The object's weight is supported by the solid material which gives rigidity to the container until the critical temperature is reached at which point the material in the container melts. The flexible container with the now fluid material inside has insufficient strength to support the object which is thereby released. Biasing means forces the container back to its original shape so that when the temperature falls below the melting temperature the material again solidifies, and the object may again be supported by the device.

9 Claims, 2 Drawing Figures

NEUTRON-ABSORBER RELEASE DEVICE

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

In a nuclear reactor, an inherent shutdown assembly includes a mass of nuclear absorber material located above the core region, sufficient to shutdown the entire system and terminate any dangerous transients. When either the neutron flux or the core coolant temperature exceeds some critical value, a trigger is actuated and this releases a latch permitting the neutron poison mass to be inserted into the core. The poison mass absorbs excess neutrons generated in the core, thereby controlling dangerous transients.

Such an assembly includes means to sense the temperature of the coolant or the neutron flux, means to hold the poison mass in a position above and ready to be released into the reactor core, and means for triggering the release of the poison mass into the core when the sensing means indicates that the critical temperature has been reached or that the neutron flux has reached a critical value. Present devices generally suffer from being one-time-only devices, that is, once they have been activated they can't be used again. This prevents in situ or ex-reactor testing of such devices. An example of such a device is a poison mass which is restrained by a membrane whose melting point is at a critical temperature. When the critical temperature is reached, the membrane melts thus releasing the poison into the reactor core. Since it is a one-time-only device, it cannot be tested to see if it is operating properly prior to the actual failure of the reactor. In addition, present devices have separate sensing, triggering and release elements which encumber design and operation, requiring in many cases external connections to the assembly. In particular, it is desirable to provide a separate sensor trigger element capable of being of small size and of being tested in situ or ex-reactor.

It is therefore an object of this invention to provide an inherent shutdown assembly for nuclear reactor.

Another object of this invention is to provide an inherent shutdown assembly capable of being tested in situ.

Another object of this invention is to provide a sensor trigger for releasing an object into an environment with the temperature or neutron flux of the environment equal to or greater than a critical value.

SUMMARY OF THE INVENTION

A resettable sensor trigger is provided for supporting an object and for releasing the object with the temperature of an environment at a critical value. The device includes a flexible container which is in contact with the environment and which assumes a linear state in an unstressed condition. The linear state is given structural support by a solid material within the container whose melting point is approximately at that of the critical value. The object to be supported is coupled to the container. When the temperature of the environment is equal to the critical value, the solid material within the container melts thereby eliminating the structural support maintaining the container in a linear condition. Since the container is flexible, the weight of the object supported, bends the container thereby releasing the object. Spring biasing means forces the container to reassume the linear condition so that when the temperature of the environment again falls below the critical value, the material within the container solidifies again giving the container structural support sufficient to support the object in the linear condition. Such a device may be used in an inherent shutdown assembly of a nuclear reactor by being placed in contact with the core coolant of the reactor or by having within the container fissionable material so that as the neutron flux increases the temperature of the fissionable material increases thereby melting the material in the container.

DETAILED DESCRIPTION OF THE PREFERRED EMBODIMENT

Figure 1:
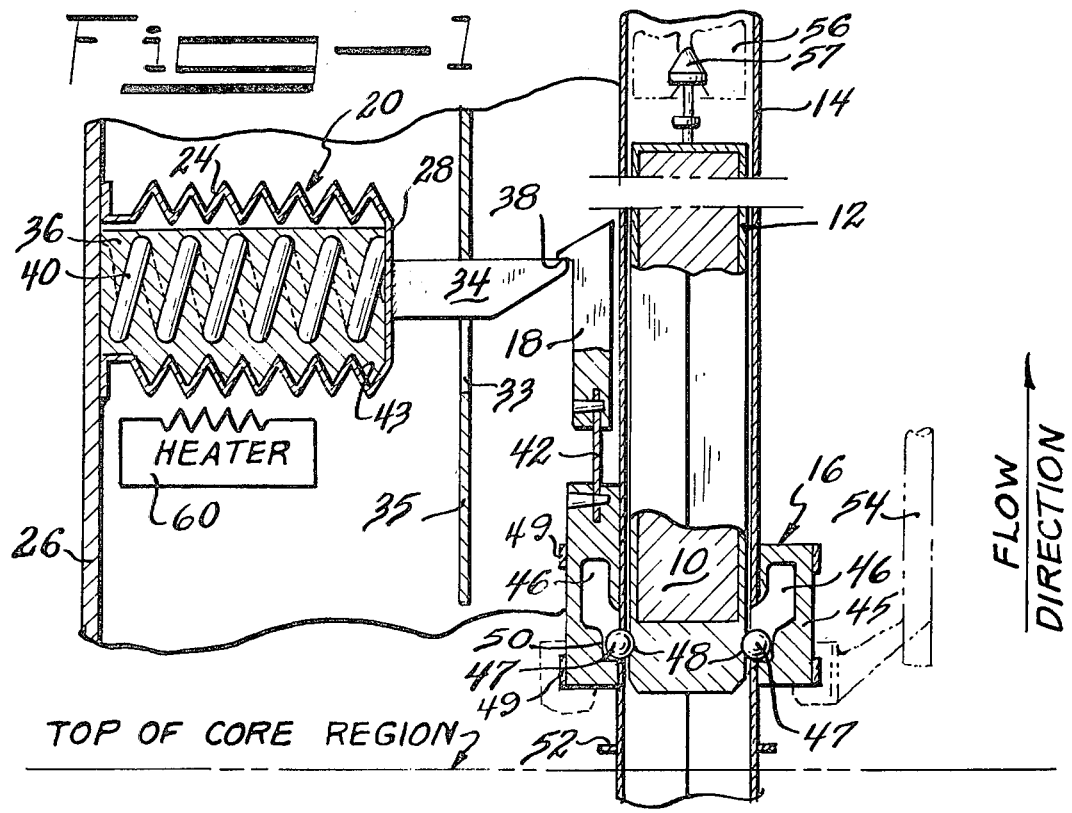
FIG. 1 is a sectional view of an inherent shutdown assembly for a nuclear reactor.

Referring to FIG. 1 there is shown an inherent shutdown assembly for a nuclear reactor. The poison mass or neutron absorber 10 is contained within a casing 12 and is held above the core region (not shown) of the reactor. The core region is normally segmented into subassembly units such as by wall 14 which is usually hexagonal. Wall 14 serves as a containment vessel for the fuel rod bundles and for the core coolant which flows through the core region up and around the absorber mass. When the temperature of this coolant reaches a critical value or when the neutron flux of the core region reaches a critical level, it is necessary for poison mass 10 to be inserted into the core region. The poison mass 10 will then absorb excess neutrons, thereby causing the reactor to shut down. The poison mass container 12 is held in a position above the core region by the interrelated combination of support structure 16, latch 18, and sensor-trigger 20. Sensor-trigger 20 is in contact with the core coolant and in response to the temperature of the core coolant being equal to or greater than a critical value, it triggers release of latch 18 allowing descent of absorber mass 10 into the core region either by gravity or with a mechanical assist. In addition, sensor-trigger 20 may include means for sensing the neutron flux and for releasing latch 18 with the neutron flux at a critical level.

In prior art devices the sensor, trigger, latch and support comprise a one-time-only use unit, which, in order to provide for the necessary structural support of poison mass 10, had to have large parts and perhaps external connection. The present disclosure describes a self-contained device in which the sensing and triggering function are separated from the support function, greatly reducing the necessary bulk of the sensor-trigger resulting in a fast response time. Further, the device is resettable so as to be capable of being tested in situ or ex-reactor.

Figure 2:
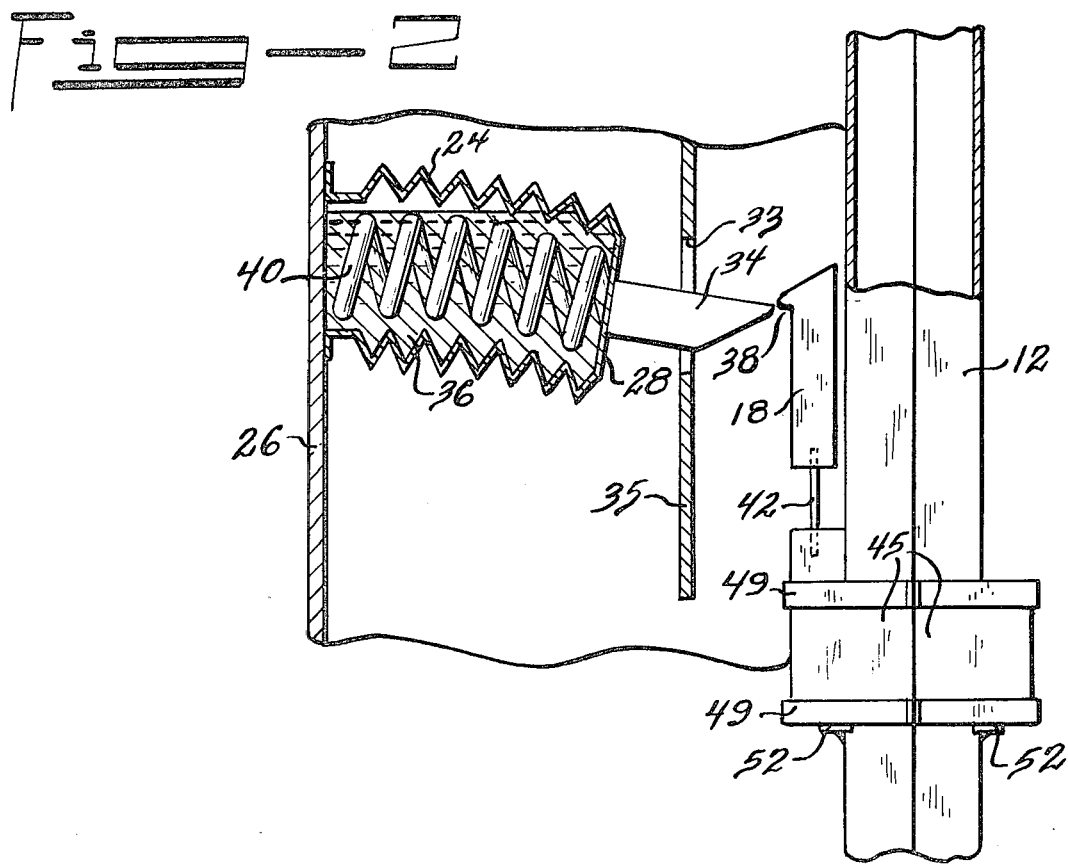
FIG. 2 shows the condition of the sensor trigger of the assembly with the critical temperature of the fuse material exceeded.

Referring to FIGS. 1 and 2, there is shown in detail sensor-trigger 20. The size of sensor-trigger 20, as shown in FIG. 1 and FIG. 2, relative to that of the other elements, should not be considered limiting. In fact, sensor-trigger 20 can be significantly smaller than the other elements. The sensor trigger includes a container 24 rigidly coupled at one end to an immovable anchor such as wall 26. Wall 26 in a nuclear reactor might be the subassembly wall or some other support of the reactor. Container 24 is flexible such as by being in the form of a bellows and should be of a material which has strength at the particular temperatures involved and which has high heat conductivity. For example, container 24 might be of stainless steel bolted or welded to wall 26. Cover plate 28 closes the other end of container 24, which in this embodiment is cylindrical, such as by the welding of plate 28 to container 24. Container 24 is free to flex about its coupling to wall 26. Latch rest 34 extends from plate 28. Latch rest 34 which is of a material whose melting point is well above the critical temperature extends through slot 33 of wall 35. This limits the flexing motion of container 24 to two dimensions. Wall 35 may extend from wall 26.

Within container 24 is a fuse material 36 whose melting point is about at the critical temperature at which release of poison mass 10 should occur. Below the critical temperature fuse material 36 is, of course, solid and provides structural support for maintaining container 24 in a linear condition as shown in FIG. 1, i.e. so that shoulder 38 of latch 18 may rest upon latch rest 34 supporting support structure 16 in a manner to be described.

With the core coolant, which is in contact with container 24, approaching the critical temperature, fuse material 36 softens and at the critical temperature melts so that the structural support provided by fuse material 36 collapses. Since the fuse material will melt and expand to form a liquid, it is desirable that the volume of container 24 assumed by the fuse material in the solid state should not completely fill up the interior of container 24. With the collapse of the structural support of container 24 as provided by fuse material 36, the weight of latch 18 upon latch rest 34 forces container 24 to bend and bow about wall 26 and forces latch rest 34 to move down within slot 33, as shown in FIG. 2. The latch 18 therefore is released. After release of latch 18, a spring means such as coil spring 40, whose melting point is well above the critical temperature and which extends between plate 28 and wall 26, acts to bias container 24 back to its linear position as shown in FIG. 1. Spring means 40 is not limited to being a coil spring but could be any type of spring including a wire stretch between plate 28 and wall 26. In fact, container 24 might be so constructed as to have an inherent bias to a linear position while still being flexible thereby negating the need for a separate spring.

With the container 24 returned to a linear condition by spring means 40 and with the temperature of the core coolant below the critical temperature, fuse material 36 hardens once again giving the container 24 structural strength in the linear position of FIG. 1. Spring 42 permits latch 18 to be bent away from rest 34 thereby allowing shoulder 38 of latch 18 to be reset on latch rest 34. Thus, the device is reusable.

For the sensing of neutron flux and for the triggering of release when the neutron flux reaches a critical level, a fissionable material may be in some manner placed within container 24 in contact with fuse material 36. This may be done by coating the wall 43 of container 24 with a fissionable material or by interspersing within fuse material 36 fissionable material or by putting a block of fissionable material within fuse material 36. As sensor-trigger 20 is positioned just above the core region, such fissionable material in container 24 will be exposed to neutron flux. As the neutron flux increases, the temperature of the fissionable material in container 24 will increase thereby heating the fuse material. As fuse material 36 is heated by the fissionable material it will melt when it reaches its melting point. In sensing neutron flux, the sensor-trigger acts in all respects as described for the sensing and triggering due to increase in core coolant temperature.

The desirable material to be used as fuse material 36 is determined by the critical temperature at which release of the objects should occur. For example, in a nuclear reactor where this temperature might be 700° C., fuse material 36 might be, for example, aluminum which has a melting point at approximately 700° C. Of course, any other metal or alloy may be used as fuse material 36 provided it has the desirable melting point and necessary strength to support the weight of the object. It is not necessary that the fuse material actually melt before release will occur. This is determined by the particular shape and strength of fuse material 36 and release may, in fact, occur as the material is softened. By experimentation with particular shapes and weights involved, one can determine the ideal temperature at which release will occur for a particular fuse material 36.

For use with a neutron poison release assembly, it is advantageous to have a support structure 16 which will release poison mass 10 with only a small downward movement of latch 18. For example, the mechanism shown in FIG. 1 would support poison mass 12 with minimal support of latch 18 by sensor-trigger 20. Support structure 16 is in two identical halves 45 each of which contains a chamber 46. Halves 45 are positioned on either side of wall 14 and are held together by links 49. Spheres 47 are within chambers 46 and engage indentations 48 in casing 12 through wall 14 and are held there by cam surfaces 50 of chambers 46. When latch 18 is released by sensor-trigger 20, the outward pressure on spheres 46 due to the weight of poison mass 10 and gravity force the opposing halves 45 to move down, removing spheres 47 from indentations 48. This releases casing 12 containing poison mass 10 which then falls into the core region. Stops 52 limit the downward movement of structure 16. The device may be reset by providing means for lifting structure 16 such as with a manipulator arm 54 and for lifting poison mass 10 such as with a grasper 56 gripping knob 57.

In situ testing may be accomplished with external heating means such as a resistance heater 60 which is coupled to a power supply not shown. The heater 60 may be positioned below sensor trigger 20 so that coolant passing heater 60 may be heated to the critical level before contacting container 24 thereby indirectly heating the fuse material to the critical level. This allows for in situ testing of the device.

The inherent properties of the device allow for confinement of the entire mechanism for shutdown activation within the immediate core region. In this way the complete shutdown action depends upon basic properties intrinsic to the shutdown assembly, e.g. the melting point of the fuse material and the biasing of the spring means. This eliminates dependence upon active components, such as used in external electric circuitry for sensing and logic functions, resulting in a low failure rate when called upon to perform as intended.

The embodiments of the invention in which an exclusive property or privilege is claimed are defined as follows:

1. A resettable device for supporting an object and for releasing the object with a parameter of an environment at a critical value, comprising:

flexible container means in contact with the environment, an anchor to which said container means is coupled, and spring means coupled to said container means for biasing said container means to a configuration extending linearly from said anchor, said container means having within a material whose temperature varies in proportion to the parameter, said material having a melting point corresponding to the critical value of the parameter;

said material occupying a sufficient volume of said container means so that with said material in the solid state and said container means in said configuration, said container means has a specific structural strength sufficient to allow the coupling thereto of the object thereby supporting the object, the object being coupled to said container means in such manner that said object exerts a force on said container means perpendicular to said configuration extending linearly from said anchor, with the parameter of the environment at least equal to the critical value thereof said material assuming the liquid state and said container having insufficient structural strength to support the object and in response to said force exerted by said object said container means flexes;

flexing of said container means due to said force releasing the coupling of the object thereto, with releasing of the coupling said container means being forced by said spring means to assume said configuration so that with the parameter of the environment falling below the critical value, said material reassumes the solid state and said container means regains said specific structural strength.

2. The device of claim 1 wherein in said configuration said container means extends horizontally from said anchor and said object is capable of being coupled to said container means such that the weight of the object exerts a downward force on said container means.

3. The device of claim 2 wherein said container means includes a first end coupled to said anchor and a second end which in said particular configuration is horizontally opposite said first end, said spring means including a spring coupled to and extending between said ends, and with said container means in said particular configuration the object is capable of being coupled to said second end.

4. The device of claim 3 wherein said container means is in the form of a flexible bellows so that with said material in the liquid state and with the object coupled to said second end the weight of the objects causes said bellows to bend downward.

5. The device of claim 4 wherein said device includes a latch rest extending from said second end upon which said object rests such that with bending of said bellows downward said object is capable of falling from said latch rest.

6. The device of claim 5 wherein the object is a neutron absorber mass for a nuclear reactor, the environment is the reactor coolant and the parameter is the temperature of the reactor coolant, and wherein the device further includes a support structure coupled to said mass for holding said mass above the core region of the reactor, and a latch coupled to said support structure and having a shoulder capable of being placed on said latch rest thereby supporting said support structure and said neutron mass, with said material in the liquid state said latch bending said container means thereby removing said shoulder from said latch rest, said support structure being responsive to removal of said shoulder from said latch rest to release said mass into the core region.

7. The device of claim 6 further including a latch spring coupling said latch to said support structure so that with said container means in said particular configuration said shoulder of said latch can be placed on said latch rest.

8. The device of claim 7 further including heating means for heating said material thereby allowing in situ testing of the device.

9. The device of claim 1 wherein within said container means in contact with said material is fissionable matter and wherein the parameter is the neutron flux of the environment, said fissionable matter being responsive to said neutron flux to heat said material proportional thereto.

* * * * *